United States Patent [19]

Morrison

[11] Patent Number: 5,507,212
[45] Date of Patent: Apr. 16, 1996

[54] RADIAL ARM SAW GLASS CUTTING ATTACHMENT

[76] Inventor: Gary Morrison, 1321 Sheridan Ave., North Braddock, Pa. 15104

[21] Appl. No.: 181,003
[22] Filed: Jan. 14, 1994
[51] Int. Cl.⁶ .............................. B26D 3/08; C03B 33/10
[52] U.S. Cl. ...................... 83/879; 83/522.15; 83/564; 33/27.03; 33/27.032; 33/32.3; 30/164.9
[58] Field of Search ...................... 83/879, 883, 486.1, 83/564, 574, 582, 522.15, 522.16, 522.24; 33/27.03, 27.031, 27.032, 27.033, 27.04, 23.3, 27.01; 30/164.9, 164.95

[56] References Cited

U.S. PATENT DOCUMENTS

| | | | |
|---|---|---|---|
| 1,462,101 | 7/1923 | Colson | 83/879 X |
| 2,311,234 | 2/1943 | Krajnc | 30/94 X |
| 2,688,801 | 9/1954 | Hess | 33/27.03 |
| 3,392,449 | 7/1968 | Tierney | 33/27.03 |
| 3,800,639 | 4/1974 | Restel | 33/32.3 X |
| 4,512,081 | 4/1985 | Park | 33/27.03 |
| 4,541,176 | 9/1985 | Croce | 30/164.95 |
| 4,688,612 | 8/1987 | Kessel et al. | 83/486.1 X |
| 5,014,436 | 5/1991 | Kozyrski et al. | 33/27.03 |
| 5,168,788 | 12/1992 | Kozyrski et al. | 30/164.95 X |

Primary Examiner—Eugenia Jones

[57] ABSTRACT

A radial arm saw glass cutting attachment including an arm having an orthogonal and a radially oriented glass cutter. The arm attaches to the radial arm saw blade attachment shaft and the shaft is oriented orthogonally to a glass plate being prepared for cutting for the purpose of producing circular or annular cut patterns, or the shaft is oriented parallel to the plane of the glass plate for the purpose of producing linear and angularly disposed linear cuts. A graduated scale which enables setting radius or diameter of a cut circle, and a thumbscrew lock for the freely sliding orthogonal cutter are included.

2 Claims, 3 Drawing Sheets

RADIAL ARM SAW GLASS CUTTING ATTACHMENT

BACKGROUND OF THE INVENTION

1. Field of the Invention

The present invention relates to glass cutting equipments and procedures and more particularly pertains to a glass cutter which may be affixed to a radial arm saw to make controlled circular scribings and straight line scribings at various angular dispositions from which circular and straight glass cuts are emergent.

2. Description of the Prior Art

The use of glass cutters for linear and circular cutting is known in the prior art. More specifically, glass cutting apparatus heretofore devised and utilized for the purpose of cutting circular and linear patterns from glass substrates are known to consist basically of familiar, expected and obvious structural configurations, notwithstanding the myriad of designs encompassed by the crowded prior art which have been developed for the fulfillment of countless objectives and requirements.

The present invention is directed to improving devices for glass cutting in a manner which is safe, secure, economical and aesthetically pleasing.

For example, U.S. Pat. No. 5,014,436 to Kozyrski et al. disclose a circle cutting system wherein circles are cut from glass by utilizing a glass cutting head attached at a desired distance from the axis of rotation of a freely pivoting elongated member having graduations indicative of the radius of the glass circle. The pivoting axis is affixed to a flexible sealing material which when pressed against the glass to be cut is held in place by ambient atmospheric pressure. A disadvantage in the Kozyrski invention is a lateral flexibility of the pivot axis which causes the circle to acquire some deviation from circularity, and an additional disadvantage is an inability to cut a straight line, in any angular disposition, from one glass edge to another. And a more significant disadvantage of the Kozyrski invention is the inability to cut annular glass rings. The present invention suffers neither a flexibility of a pivoting axis induced inaccuracy nor an inability to cut glass from edge to edge in any angular disposition. And furthermore, the present invention permits cutting of annular glass rings from a single glass substrate.

In U.S. Pat. No. 5,168,788 to Kozyrski et al. a cutting head turret assembly is disclosed wherein the turret assembly comprises a glass cutter and a plastic cutter capable of being rotated to a detent for selection of one or the other cutter type. There is no provision for producing circular cuts in glass nor is there an intrinsic linear guide enabling cutting glass at various angular dispositions in the Kozyrski et al. patent. The present invention enables cutting precise circles and straight lines at various angular dispositions in glass and plastic substrates.

In U.S. Pat. No. 4,843,764 to Bando a glass plate grinding apparatus is described. The Bando invention comprises a driven chain conveyance for moving glass plates into engagement with an edge grinder thereby facilitating high rate production of glass having ground edges. There is no provision in the Bando invention for cutting glass. The present invention applies solely to glass cutting.

In U.S. Pat. No. 3,678,628 to McMaster an apparatus for cutting and grinding glass is disclosed for cutting a predetermined pattern in glass followed by a grinding apparatus which finishes the cut edge. A disadvantage in this prior art lies in a lack of a simplistic arrangement employable outside the factory floor for cutting circular and other patterns in glass substrates of relatively small dimension. The present invention affixes to a common radial arm saw and provides the small shopkeeper and hobbyist with the capability to cut original and furthermore accurately reproduce parts from plate glass.

U.S. Pat. No. 4,982,531 to Biebuyck discloses a method employing abrasive tools for the combined cutting and trimming of glass or crystal articles and an apparatus for carrying out the said method. The disclosure teaches an abrasive disc machining technique and apparatus employed to both cut and finish the cut surface of three dimensional articles such as crystal vases and the like. The disclosure makes no provision for cutting circular parts from substantially two dimensional glass plate which is a primary advantage of the present invention. Furthermore, the Biebuyck invention comprises a necessarily large and costly apparatus suitable for factory floor applications and not economically applicable to hobbyist or small shop operations.

In U.S. Pat. No. Des. 268,392 to Insolio the ornamental design for a glass cutter attachment is disclosed having an enlarged finger pressure application portion attaching to a conventional manual wheel style glass cutter apparatus. The Insolio patent does not treat any device improving the ability to cut circular or angular shapes from glass plate. The present invention discloses a device and method for accurately performing circular cutting of glass plates and for cutting lines at various angular dispositions thereby forming rectangular and triangular cut parts of great precision.

In this respect, the radial arm saw glass cutting attachment according to the present invention substantially departs from the conventional concepts and designs of the prior art, and in so doing provides an apparatus primarily developed for the purpose of cutting circles and triangular shapes from thin planar glass substrates.

Therefore, it can be appreciated that there exists a continuing need for new and improved glass cutting apparatus and technique which can be employed to cut circular and triangular glass portions from glass plate substrates. In this regard, the present invention substantially fulfills this need.

As illustrated by the background art, efforts are continuously being made in an attempt to improve and further develop glass cutting and finishing apparatus. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of glass cutting apparatus now present in the prior art, the present invention provides an improved glass pattern cutting construction wherein the same can be utilized for cutting circular and triangular shapes from planar glass substrates. As such, the general purpose of the present invention, which will be described subsequently in greater detail, is to provide a new and improved glass cutting apparatus and method which has all the advantages of the prior art glass cutting apparatus and none of the disadvantages.

The invention is defined by the appended claims with the specific embodiment shown in the attached drawings. For the purpose of summarizing the invention, the invention may be incorporated into an attachment affixed to the blade attachment shaft of a radial arm saw when the radial arm saw is unpowered and thereby removed from conventional use. The attachment comprises two glass cutters wherein a first cutter is orthogonal to the radial arm saw blade attachment shaft and positioned at the end of a radially disposed arm member, and a second cutter is parallel to the blade attachment shaft and affixable to an extension of the radial arm member at a predetermined distance from the rotational axis. The first cutter is operated having the blade attachment shaft horizontally disposed with respect to the saw working table thereby permitting the first cutter to engage a glass plate lying on the table and producing a linear glass cut at any of a variety of angles only limited by the azimuthal capabilities of the radial arm saw employed. The second cutter requires an orthogonal disposition of the blade attachment shaft with the saw table thereby permitting the manual inducement of circular motion of the second cutter and furthermore causing cutting of a circular pattern by engagement with a glass plate lying on the saw table.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a radial arm saw glass cutting attachment for cutting circular, rectangular, and triangular shapes from planar glass substrates.

It is therefore an additional object of the present invention to provide a new and improved glass cutter which has all the advantages of the prior art glass cutters and none of the disadvantages.

It is another object of the present invention to provide a new and improved radial arm saw glass cutting attachment which may be easily and efficiently manufactured and marketed.

It is a further object of the present invention to provide a new and improved radial arm saw glass cutting attachment which is of a durable and reliable construction.

An even further object of the present invention is to provide a new and improved radial arm saw glass cutting attachment which is susceptible of a low cost of manufacture with regard to both materials and labor, and which accordingly is then susceptible of low prices of sale to the consuming public, thereby making such radial arm saw glass cutting attachments economically available to the buying public.

Still yet another object of the present invention is to provide a new and improved radial arm saw glass cutting attachment which provides in the apparatuses and methods of the prior art some of the advantages thereof, while simultaneously overcoming some of the disadvantages normally associated therewith.

Still another object of the present invention is to provide a new and improved radial arm saw glass cutting attachment having a conventional attachment interface for a common radial arm saw.

Yet another object of the present invention is to provide a new and improved radial arm saw glass cutting attachment capable of generating a series of annular glass rings cut from a single glass substrate.

Even still another object of the present invention is to provide a new and improved radial arm saw glass cutting attachment using solely manual means to cut various glass patterns.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
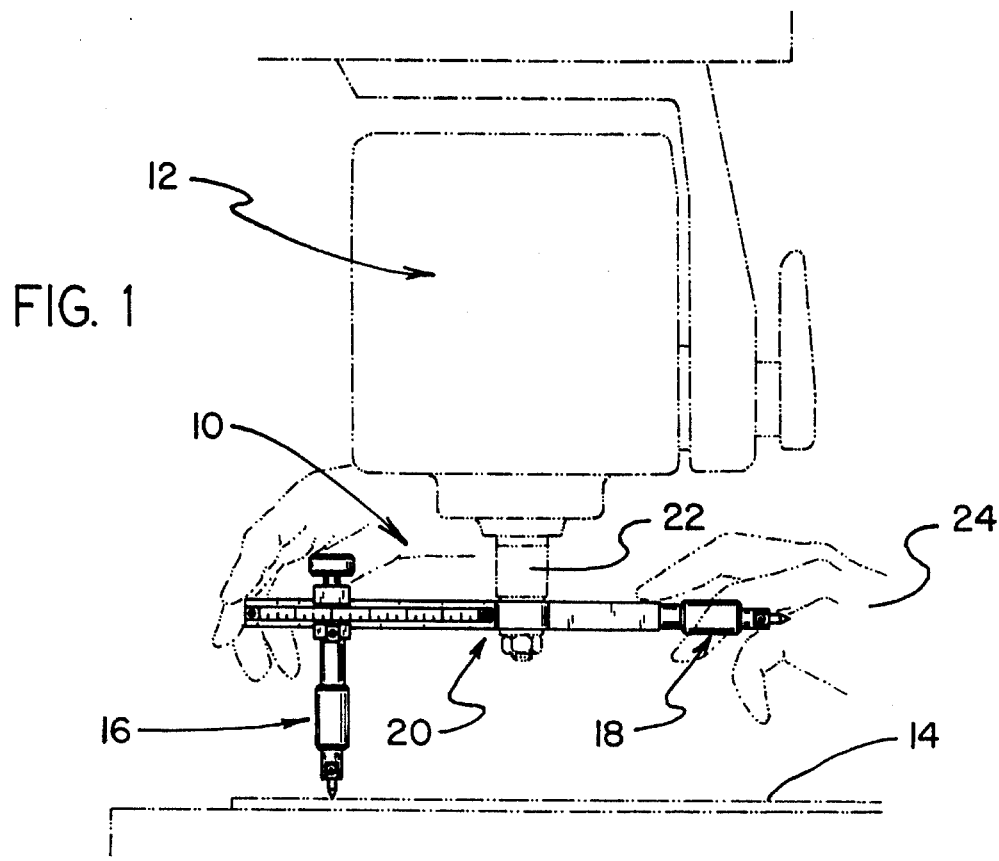
FIG. 1 is a side elevational view of the radial arm saw glass cutting attachment showing the disposition employed for cutting circular patterns.

With reference now to the drawings, and in particular to FIG. 1 thereof, a new and improved radial arm saw glass cutting attachment embodying the principles and concepts of the present invention and generally designated by the reference numeral 10 will be described.

Figure 2:
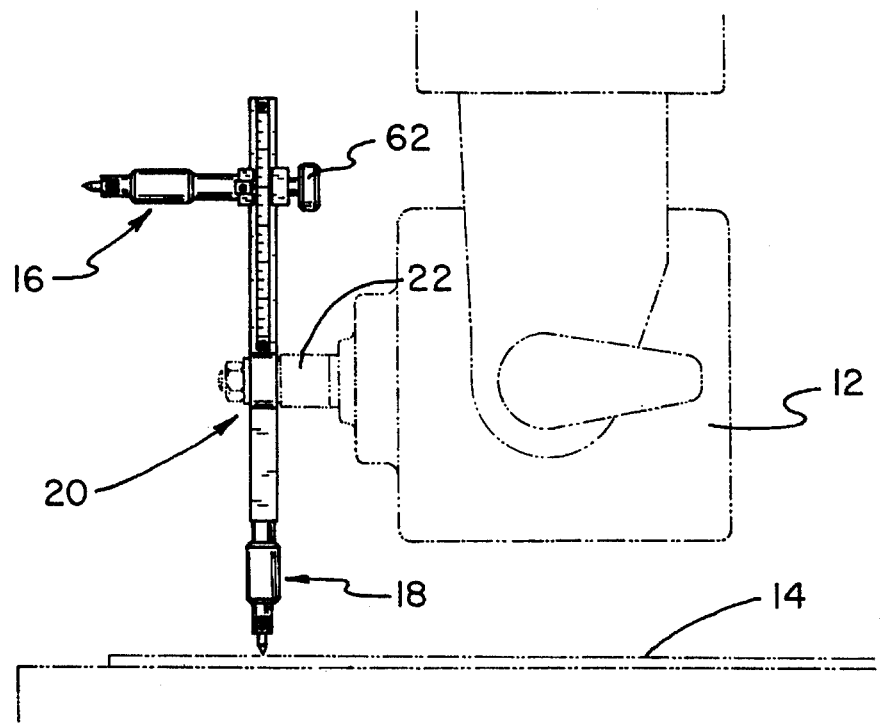
FIG. 2 is a side elevational view of the radial arm saw glass cutting attachment in a linear cutting position.

From an overview standpoint, the radial arm saw glass cutting attachment 10 is adapted for use with a conventional, non energized radial arm saw 12 to cut glass plate 14 in circular, rectangular, or triangular patterns. See FIGS. 1 and 2. The radial arm saw glass cutting attachment 10 comprises a first cutter member 16, which whenever selected, engages glass plate 14 in a circular pattern, a second cutter member 18, which whenever selected, engages glass plate 14 in a linear pattern, and a radial member 20 engaging the radial arm saw blade attachment shaft 22 and furthermore having both the first cutter member 16 and second cutter member 18 affixed to the opposing ends therein. FIG. 1 shows the first cutter member 16 engaging glass plate 14 for the purpose of performing a circular cut under a motive force supplied by human hands 24. The blade attachment shaft 22 of radial arm saw 12 is necessarily orthogonally disposed to glass plate 14 in performing the circle cutting operation. FIG. 2 shows the second cutter member engaging glass plate 14 for the purpose of making a linear cut by applying forces substantially along the direction of travel of the motor portion of the radial arm saw, and furthermore the direction of travel of said motor portion may be adjusted in azimuth using standard features of the radial arm saw thereby generating cut glass parts having angularly disposed edges of predetermined degree. And furthermore, the blade attachment shaft 22 is necessarily maintained in a parallel alignment with respect to glass plate 14 in performing a linear cutting operation.

Figure 3:
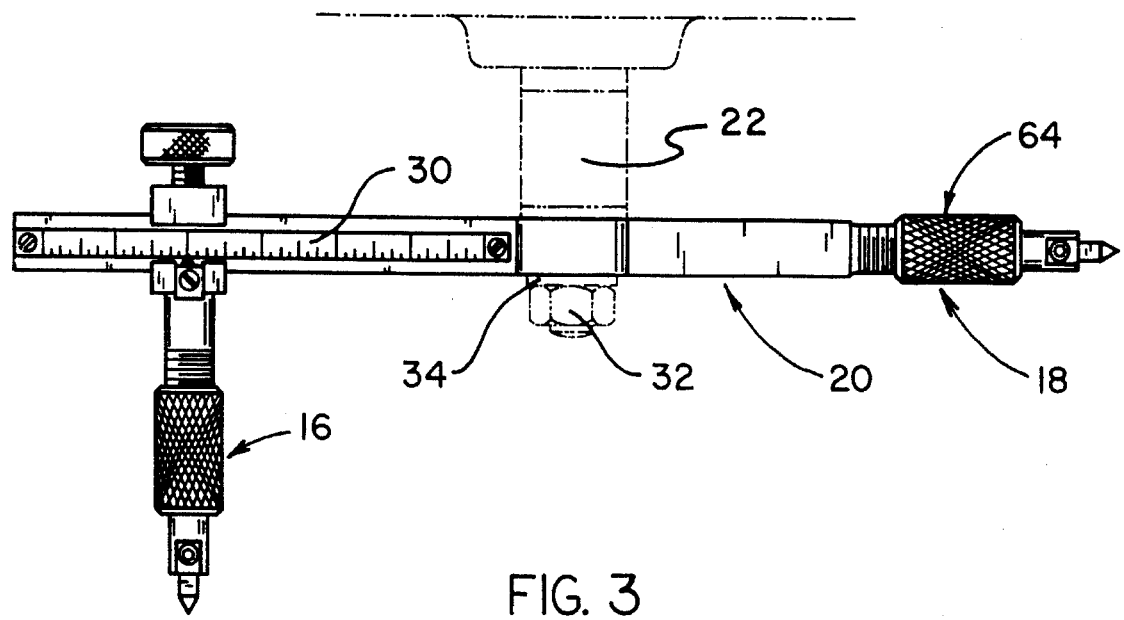
FIG. 3 is a magnified side elevational view of the radial arm saw glass cutting attachment.
Figure 4:
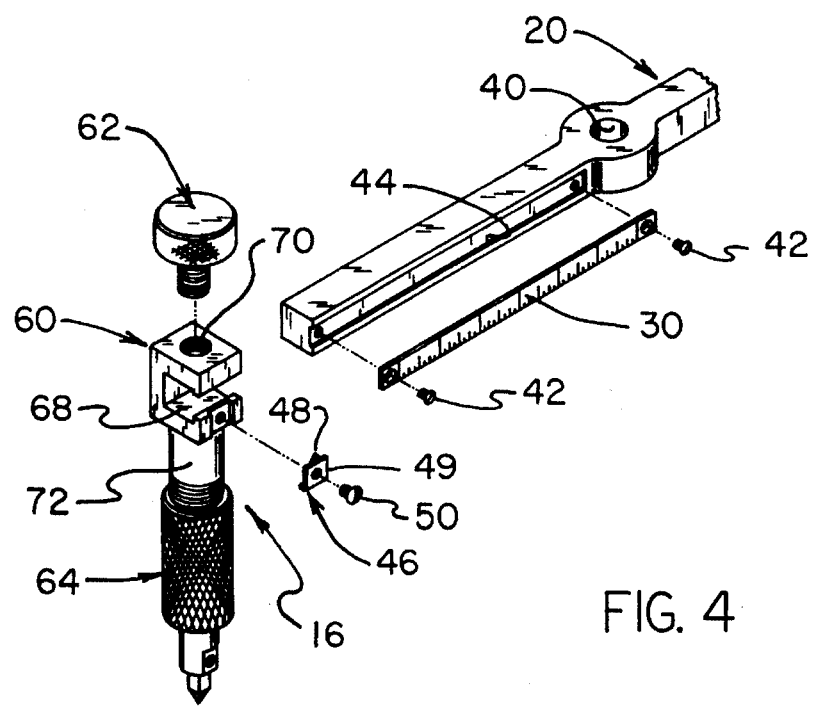
FIG. 4 is a fragmentary exploded sectional view of the radial arm saw glass cutting attachment shown while not engaging a radial arm saw blade attachment shaft.
Figure 5:
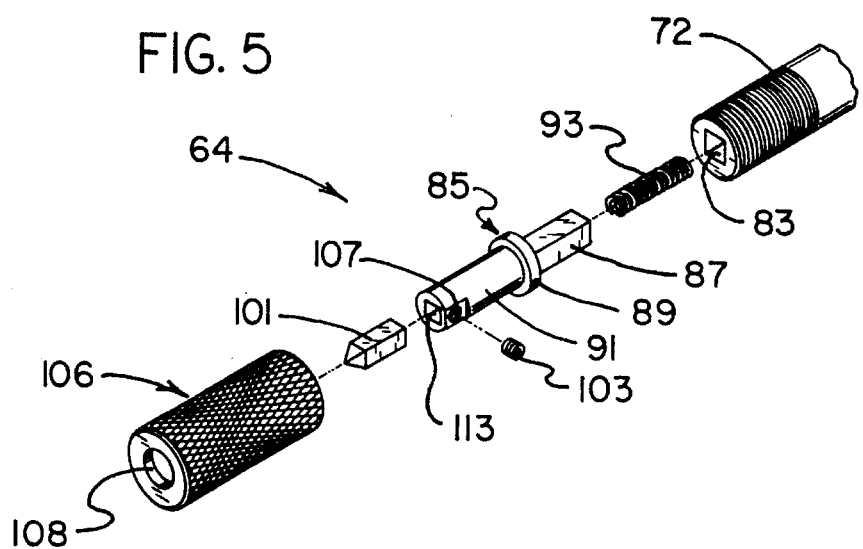
FIG. 5 is a fragmentary exploded perspective view of a radial arm saw glass cutting attachment showing the circular pattern cutter assembly.
Figure 6:
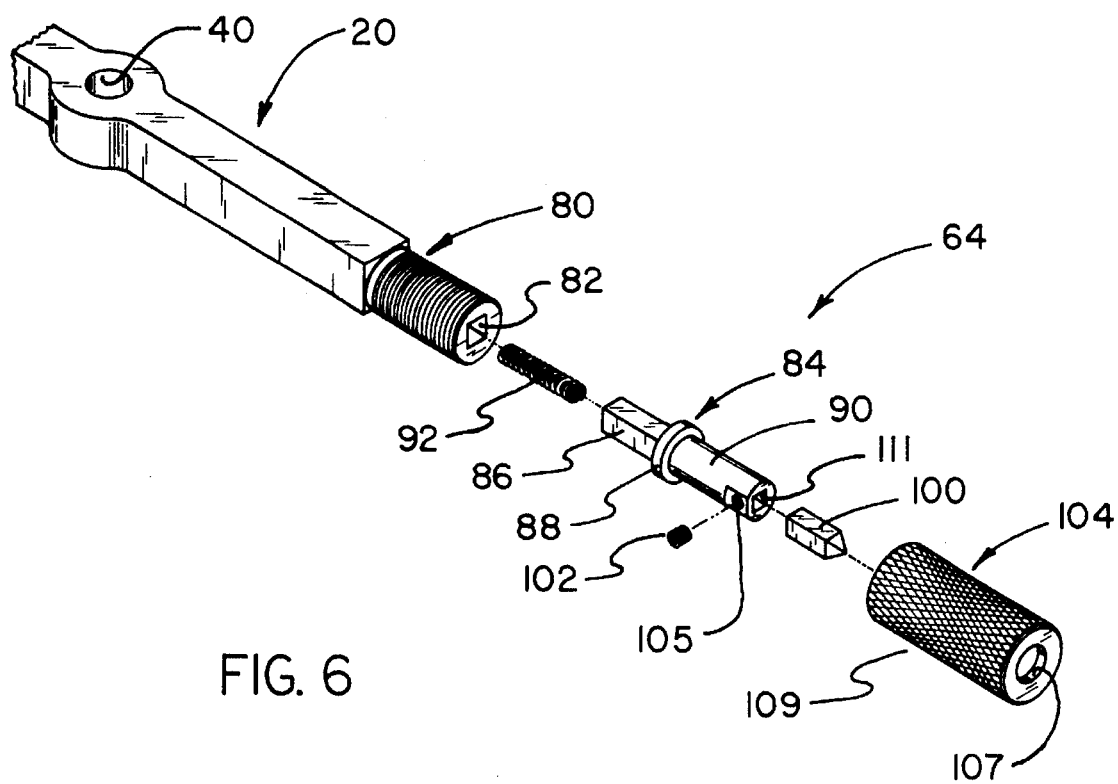
FIG. 6 is a fragmentary exploded perspective view of the radial arm saw glass cutting attachment showing the linear pattern cutter assembly.

More specifically, it will be noted that the radial arm saw glass cutting attachment comprises an elongated radial member 20, a first cutter orthogonal to and slidably engaging a substantial portion of radial member 20, a second cutter 18 in alignment with and rigidly affixed to an opposing end of radial member 20, and a mensuration scale 30 affixed to radial member 20. See FIGS. 3 and 4.

Radial member 20 comprises an elongated rod of substantially rectangular cross section and having a through hole 40 engaging the radial arm saw blade attachment member 22 and being held in place by nut 32 and washer 34. Radial arm saw blade attachment member 22 may include one or more spacers thereby providing secure engagement of nut 32 and radial member 20. Such spacers are commonly available and employed in attaching various components such as dado and molding cutter heads in customary usage with radial arm saws.

Radial member 20 is generally asymmetrical about the axis of through hole 40 there being a substantially longer material length on the end engaging the orthogonally mounted first cutter 16 than found on the opposing end. And furthermore the longer portion of radial member 20 has affixed on one side the scale 30 using mounting screws 42.

Scale 30 is fitted to a recessed region 44 of radial member 20 to prevent scratching or obliteration of graduated markings applied to scale 30 principally by frictional interaction with slidably engaged first cutter 16. An indexing tab 46 having a pointed portion 48 and a mounting through hole 49 is affixed to first cutter 16 using screw 50.

Pointed portion 48 is maintained in alignment with the engagement site of first cutter 16 and glass plate 14 thereby indicating, according to the graduated scale 30, the distance from the center of the rotational axis of radial member 20 which is coincident with the axis of through hole 40. Scale 30 is subdivided in common units such as centimeters or inches and fractions thereof and is compensated for being offset from the axis of rotation.

Graduations of scale 30 may include radial distance, diametric distance, or a combination thereof. First cutter member comprises slidable engagement portion 60, locking thumbscrew 62, and spring energized cutter attachment 64. Second cutter member 18 comprises spring energized cutter attachment 64, which is of construction identical to that employed in first cutter member 16. Slidable engagement portion 60 comprises a C shaped portion 68 having a threaded hole 70 at one end and affixed to a partially threaded short rod 72.

C shaped portion 68 has inner dimensions permitting free sliding engagement with the longer portion of radial member 20. A second threaded hole and recessed region is provided for attachment of indexing tab 46. The end of radial member 20 having affixed therein a spring energized cutter attachment 64 is made circular in cross section and is threaded through a cutter attachment portion 80. A deep square section hole 82 is provided along the centerline of cutter attachment portion 80 and a similar square hole 83 is provided along the centerline of short rod 72.

A cutter holder 84 comprising a square end portion 86, a central circular flange portion 88, and a cylindrical end portion 90 is employed to hold a square section cutter tip 100. Square end portion 86 is free to slide into hole 82 until impeded by flange portion 88, howsoever spring 92 provides restoring force thereby maintaining pressure on cutter holder 84. And similarly cutter holder 85 comprises square end portion 87, central circular flange portion 89, and a cylindrical portion 91 is employed to hold a square section cutter tip 101.

Square end portion 87 is free to slide into hole 85 until impeded by flange portion 89, where spring 93 provides restoring force thereby maintaining pressure on cutter holder 85. Cylindrical portion 90 and cylindrical portion 91 have square holes 111 and 113 formed in their free ends. Holes 111 and 113 are in general alignment with the axis of cylindrical portion 90 or 91 wherein said square holes 111 and 113 engage cutter tip 100 and tip 101 respectively. Cutter locking setscrew 102 and locking setscrew 103 threadedly engage hole 105 and 107 and appear in a perpendicular relation to the axis of and near the free end of cylindrical portion 90 and cylindrical portion 91. Flats 105 and 107 are provided to preclude interference of setscrew 102 and 103 with cap 104 and 106 respectively.

Cap 104 and identical cap 106 have a threaded interior, a knurled outer surface 109, and a perforated end having sufficient clearance to freely permit protrusion of cutter tip 100 or cutter tip 101 through hole 107 or hole 108, respectively. Cap 104 threadedly engages cutter attachment portion 80 and cap 106 threadedly engages cutter attachment portion 72 wherein both caps 104 and 106 are tightened to an extent providing compression in part for spring 92 and spring 93. A result of the aforementioned arrangement is the application of spring loaded engagement forces to cutter tip 100 or cutter tip 101 with glass plate 14 thereby achieving consistent cutting results without regarding small table misalignments or glass surface undulations.

The radial arm saw glass cutting attachment 10 may alternately be equipped with plastic cutting scribes and blades thereby providing a capability for cutting precise circles and rings, rectangular, and triangular shapes in plastics.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by LETTERS PATENT of the United States is as follows:

1. A radial arm saw glass cutting attachment for cutting various patterns from glass plates comprising:

an elongated radially disposed arm member which, when operationally disposed is affixed to a blade attachment shaft of a radial arm saw using attachment means;

a first glass cutting means orthogonally disposed and slidably engaged to said elongated radially disposed arm member;

a fixedly engaged second glass cutting means held at one end of and substantially in alignment with the longitudinal axis of said radially disposed arm member, the first glass cutting means comprising a first glass cutting insert and a first spring loaded mechanism providing force to said first glass cutting insert wherein said first spring loaded mechanism and said first cutting insert are retained by a first threadedly engaging perforated cap, the second glass cutting means comprising a second glass cutting insert and a second spring loaded mechanism providing force to said second glass cutting insert wherein said second spring loaded mechanism and said second cutting insert are retained by a second threadedly engaging perforated cap; and a graduated scale affixed to said elongated radially disposed arm member, and wherein said graduated scale, employed in conjunction with the first glass cutting means, provides a visual indication of radius, diameter, or radius and diameter of a circular cut pattern.

2. The radial arm saw glass cutting attachment of claim 1 in which each glass cutting insert is a pointed scribe having a hardened tip portion.

\* \* \* \* \*